Jan. 5, 1954 E. A. FUGLIE 2,664,926
AUTOMATIC LUMBER-RELEASING TRAVELING GANG SAW SAWMILL
Filed Aug. 3, 1949 8 Sheets-Sheet 1
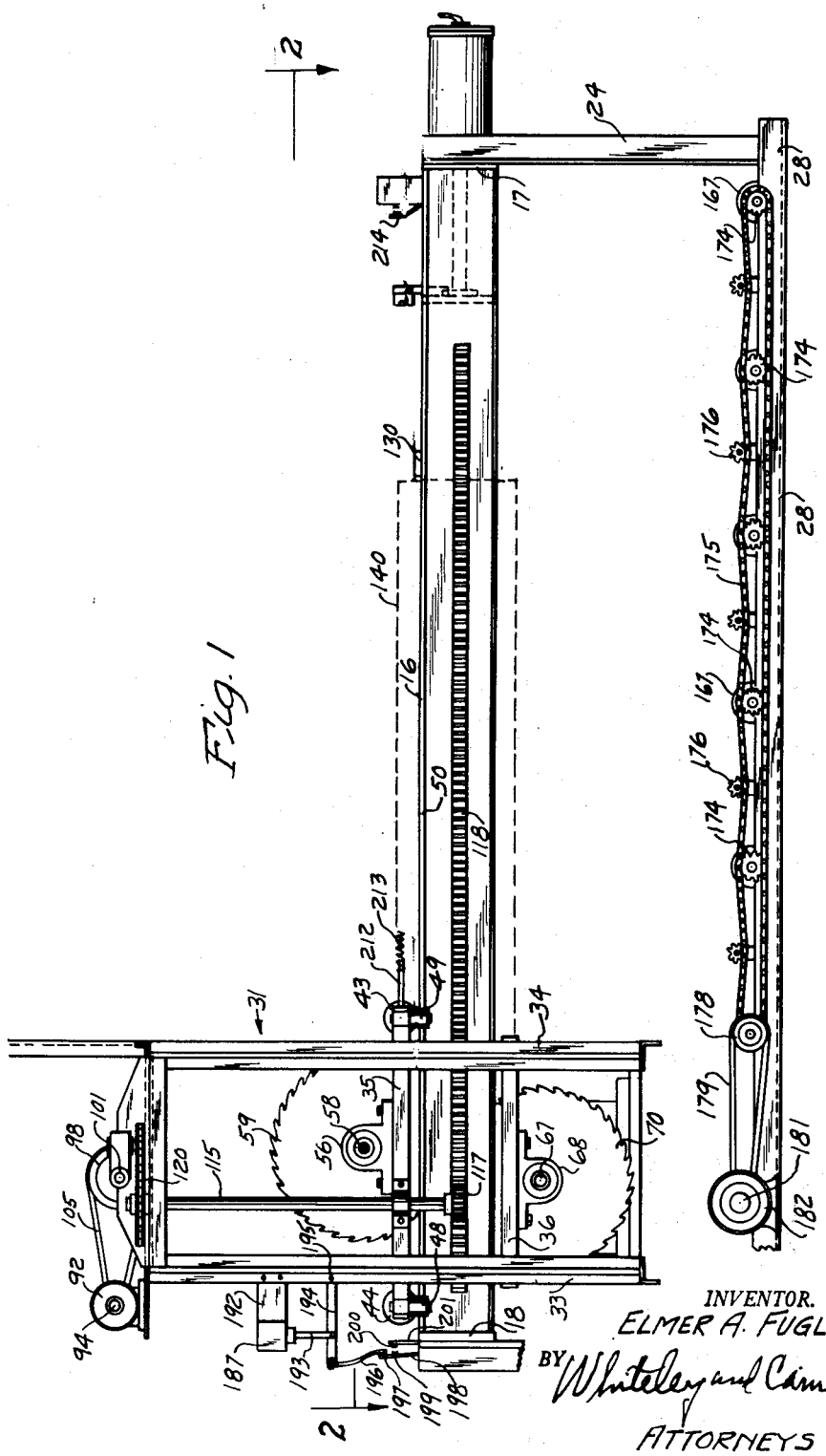
INVENTOR.
ELMER A. FUGLIE
BY
ATTORNEYS Jan. 5, 1954 E. A. FUGLIE 2,664,926
AUTOMATIC LUMBER-RELEASING TRAVELING GANG SAW SAWMILL
Filed Aug. 3, 1949 8 Sheets-Sheet 2
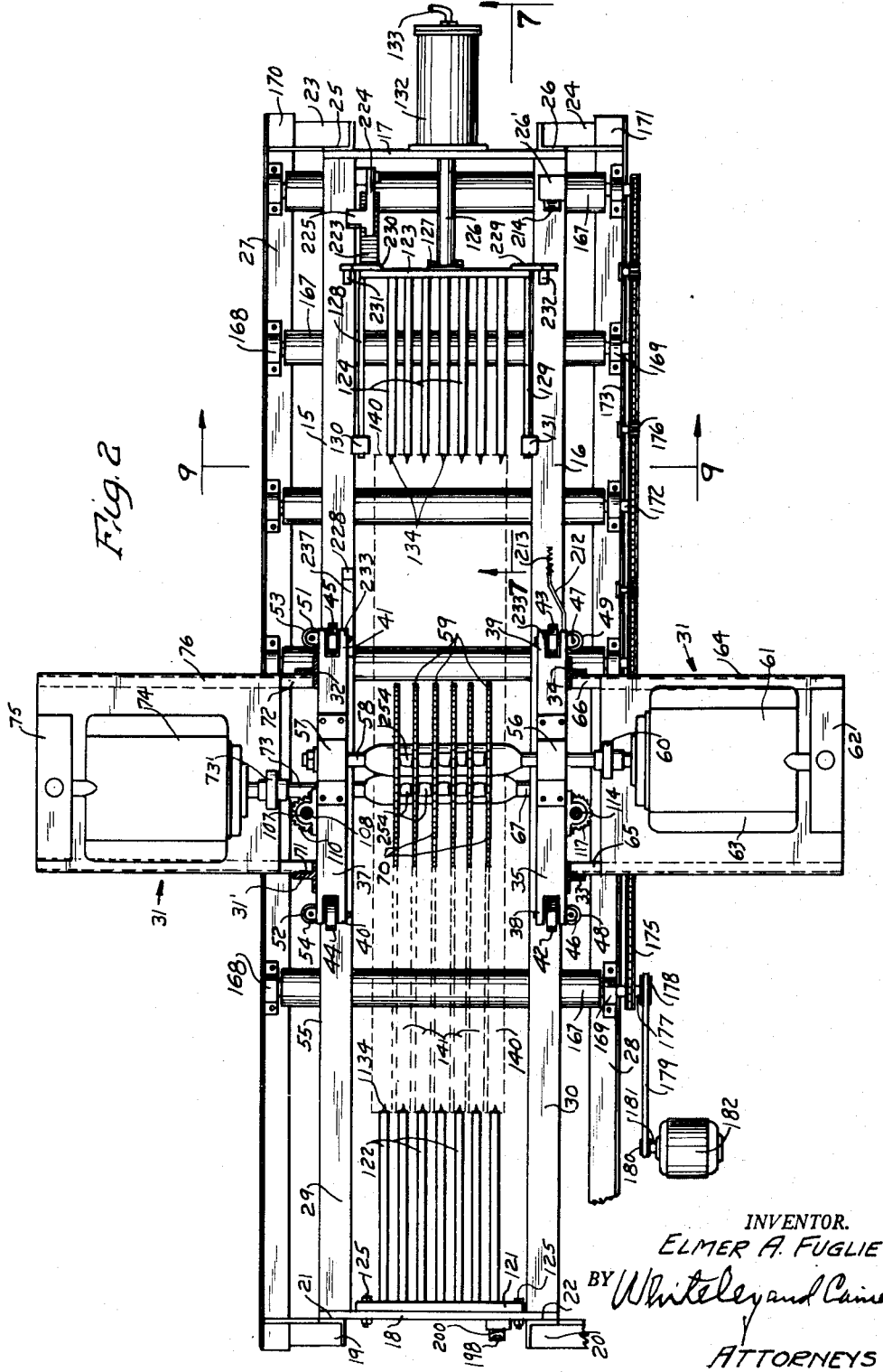
INVENTOR.
ELMER A. FUGLIE
BY Whiteley and Caine
ATTORNEYS

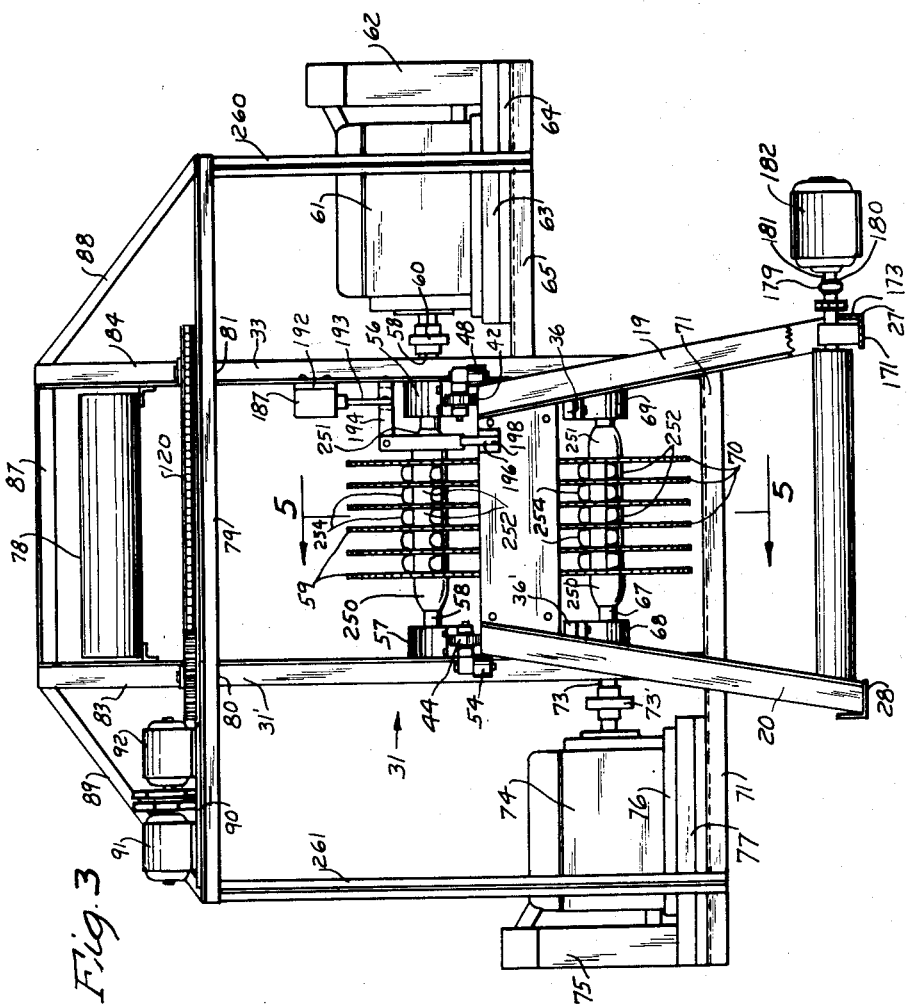

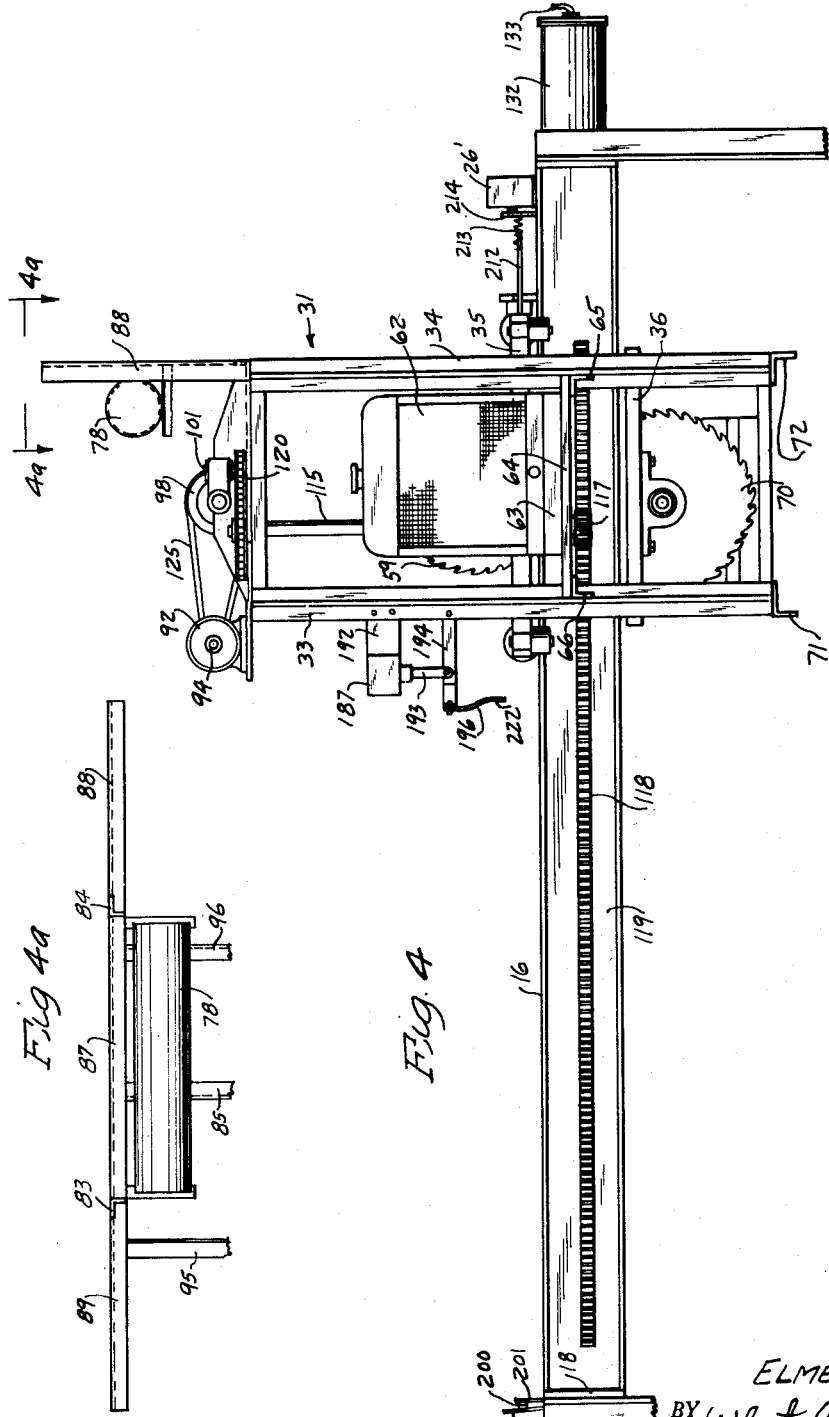

Jan. 5, 1954        E. A. FUGLIE        2,664,926
AUTOMATIC LUMBER-RELEASING TRAVELING GANG SAW SAWMILL
Filed Aug. 3, 1949        8 Sheets-Sheet 5
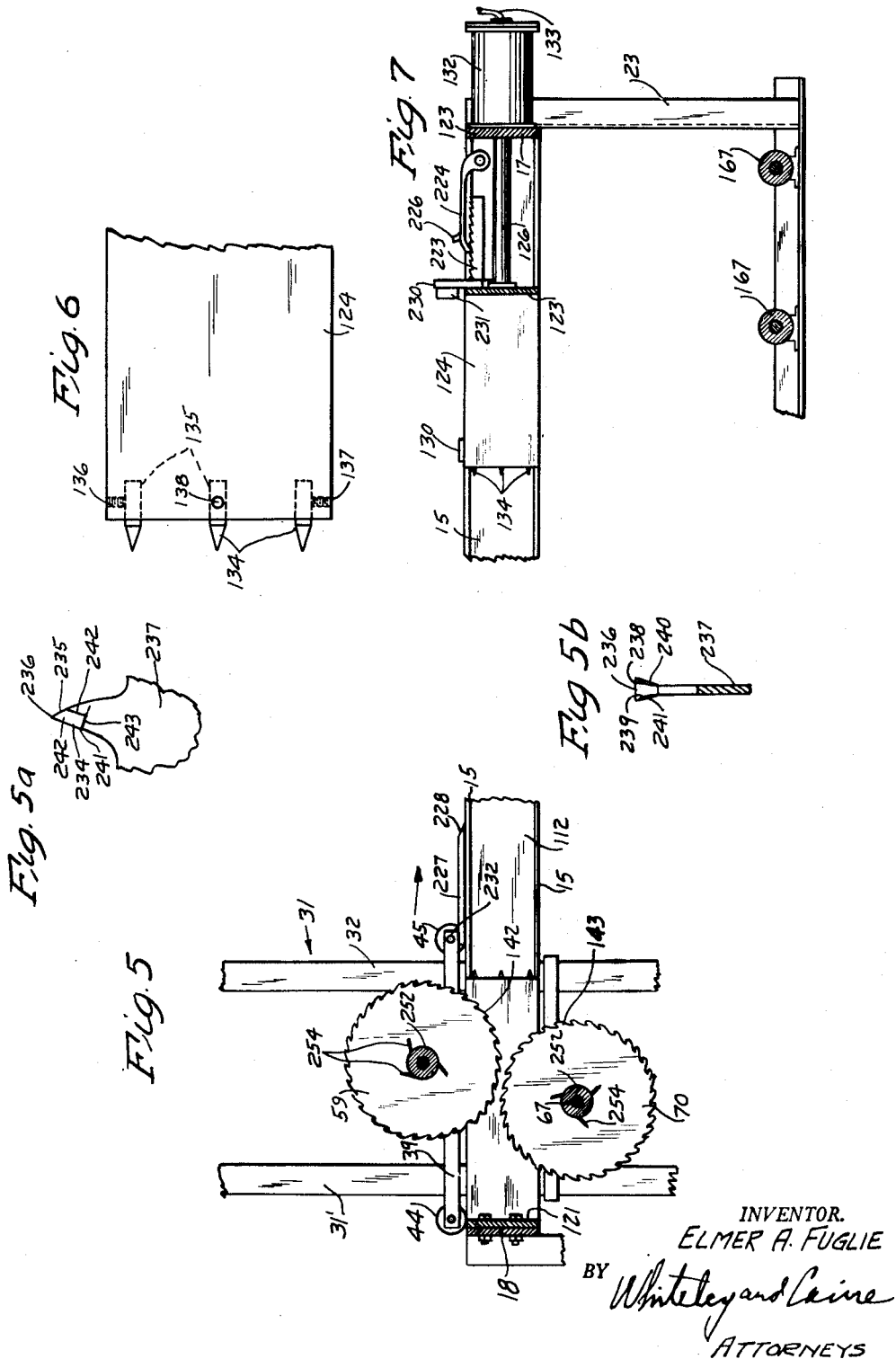
INVENTOR.
ELMER A. FUGLIE
BY Whiteley and Caine
ATTORNEYS Jan. 5, 1954 E. A. FUGLIE 2,664,926
AUTOMATIC LUMBER-RELEASING TRAVELING GANG SAW SAWMILL
Filed Aug. 3, 1949 8 Sheets-Sheet 6
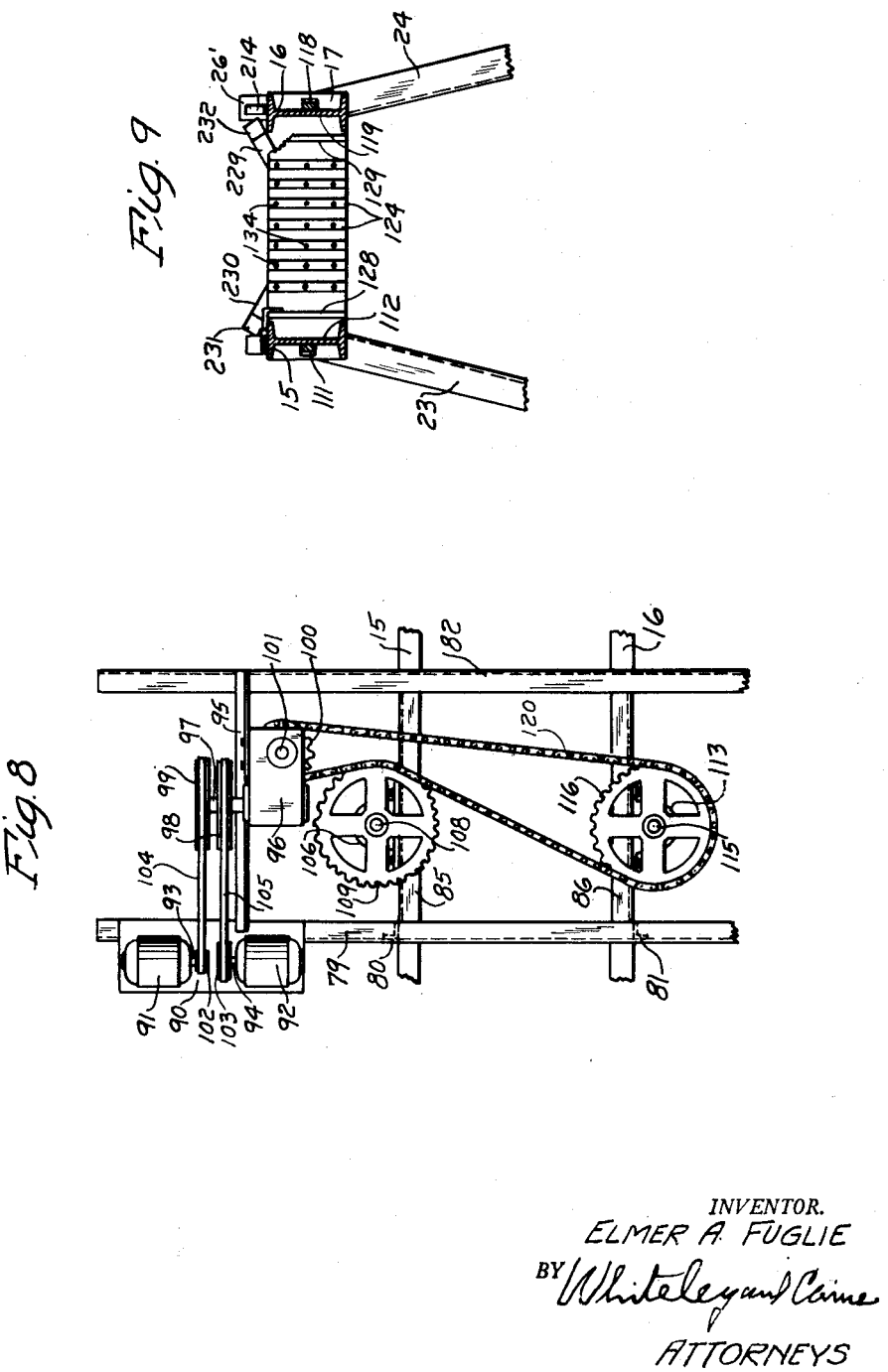
INVENTOR.
ELMER A. FUGLIE
BY
ATTORNEYS

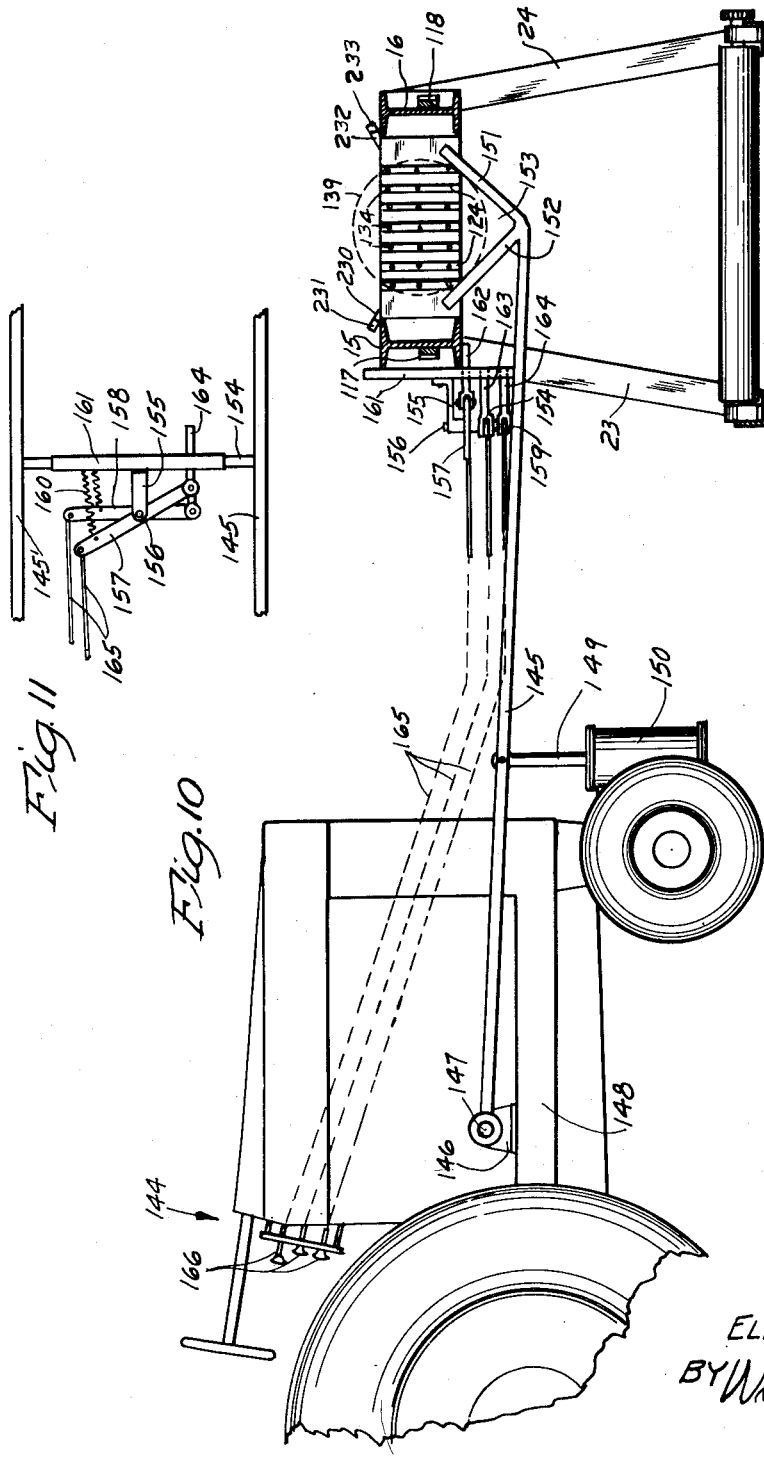

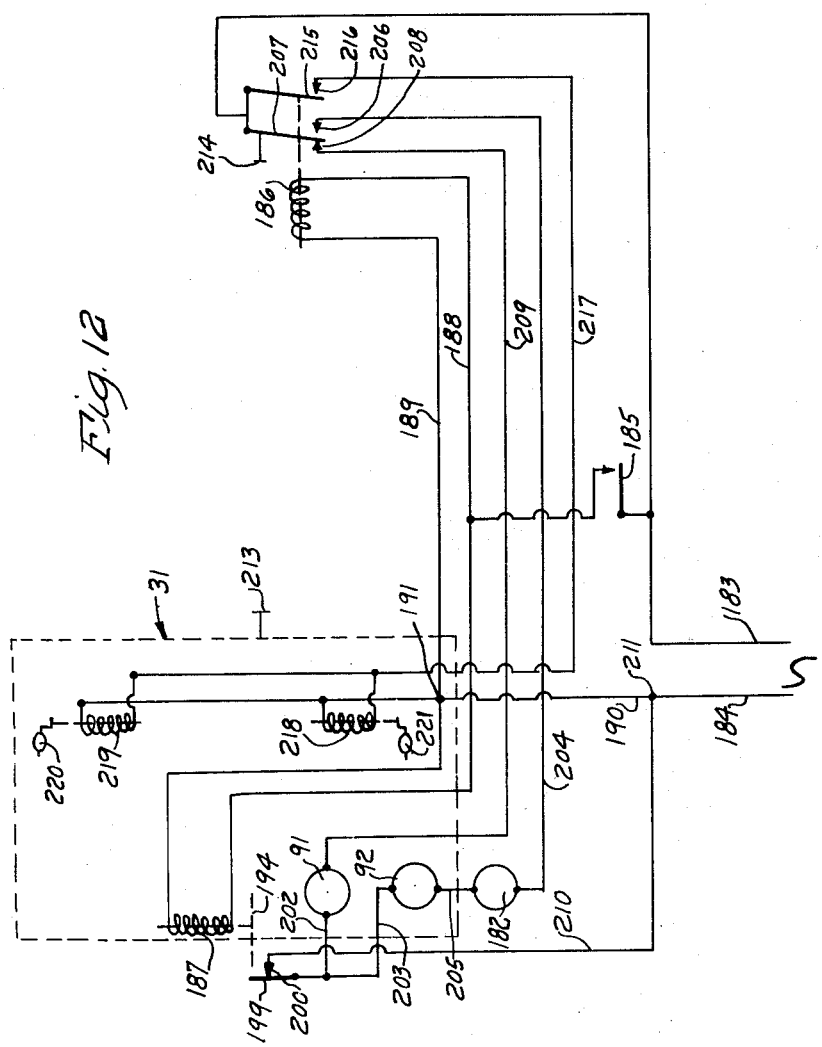

Patented Jan. 5, 1954

2,664,926

UNITED STATES PATENT OFFICE 2,664,926

AUTOMATIC LUMBER-RELEASING TRAVELING GANG SAW SAWMILL

Elmer A. Fuglie, Winona, Minn., assignor to Winona Tool Manufacturing Company, Winona, Minn., a partnership Application August 3, 1949, Serial No. 108,278

3 Claims. (Cl. 143—47)

This invention relates to improvements in an automatic saw mill intended to saw logs or heavy timbers into boards or slabs. In general the invention is concerned with a mill having a traveling saw frame on the engine driven saws are mounted, and the movement of the saw frame and a carry-off conveyor are controlled by a group of electric motors whose operation is controlled by the movement of the saw frame relative to the mill frame. The invention is also concerned with means for gripping the logs or timbers and the release thereof after the sawing operation.

Although the sawing of logs into slabs or boards is well known, it has not heretofore been possible to provide a substantially automatic mill, which after the log has been suitably lodged therein performs all of the sawing and releasing actions necessary to dispose of the boards without manual control or supervision.

In the present invention I have provided a mill into which a log or timber is introduced and secured by a stationary chuck at one end and a movable chuck at the other end. The sawing operation is conducted by two separate sets of blades carried by a movable saw carriage with the blades of each set operating in the same planes and with each set driven by an independent engine. The movement of the saw carriage is controlled by a pair of electric motors arranged so that one motor moves the frame in one direction and the other motor serves to return the frame to its original position. In addition to the frame motors, a third motor is provided for operating a carry-off conveyor situated beneath the saw blades and arranged to receive and carry off the sawed boards. The control of these motors is by a circuit which includes switches disposed at the opposite ends of the mill so as to be actuated by the movement of the saw frame.

All of these various control features are properly programed so that after a log or timber has been properly placed in the mill and secured therein by the gripping means, the sawing operation is commenced by the closing of a manual switch and thereafter the various steps including the movement of the saw frame, acceleration and deceleration of the saw engines, the releasing of the sawed timbers, and the return of the saw frame to its original position occur in properly timed sequence thereby avoiding any possible injury to an operator or damage to any part of the mill.

In order to properly discharge the sawed boards a releasing mechanism is provided which includes a first part carried by the mill and a second part carried by the saw carriage which operates releasing means and simultaneously bumps the several boards from their holding chucks when the operation is completed.

An object of the invention is to provide an automatic saw mill for sawing logs or timbers into slabs or boards and in which after a log has been properly placed and secured in the mill and the sawing operation commenced, all other acts including the disposition of the sawed boards are automatically controlled.

Another object is to provide a mill including a movable saw carriage, together with means for gripping a log and automatically releasing the sawed boards by coaction between portions of the mill and the saw carriage.

Another object is to provide in a mill including a movable saw carriage containing a pair of engines for driving the saws a first pair of motors for controlling the carriage, and a second pair of motors for controlling speed, and a circuit including said motors and switches controlled by the movement of the carriage to control said several motors.

A further object is to provide in a mill including a frame and a movable carriage mounted thereon a pair of electric motors for controlling the movement of the carriage and another motor operating a carry-off conveyor, together with a suitable circuit connected to said motors and operated by the movement of the saw carriage to control the operation of the motors in properly timed sequence.

The full objects and advantages of my invention will appear in connection with the detailed description thereof to be given in the following specification, and the important and advantageous results of my invention in producing a wholly automatic sawing operation particularly adapted to saw small and crooked logs will be particularly pointed out in the claims.

In the drawings showing a form of mechanism for carrying out my invention:

Fig. 1 is a side elevation view of my machine with the saw carriage at its rear operating position.

Fig. 2 is a sectional plan view taken on line 2—2 of Fig. 1.

Fig. 3 is an end elevation view of the machine as seen from the right side of Fig. 1.

Fig. 4 is a side elevation view similar to Fig. 1 with the saw carriage in its forward or most advanced position.

Fig. 4a is a sectional plan view on an enlarged scale taken on line 4a—4a of Fig. 4.

Fig. 5 is a sectional view taken on line 5—5 of Fig. 3.

Fig. 5a is a plan view on an enlarged scale of a special type of saw tooth points substantially wider than the thickness of the saw disk employed with my invention.

Fig. 5b is an edge view of the saw shown in Fig. 5a with some parts broken away.

Fig. 6 is an enlarged detail plan view of one of the chuck plates.

Fig. 7 is a sectional elevation view taken on line 7—7 of Fig. 2.

Fig. 8 is a top plan view of the driving mechanism only for the saw carriage.

Fig. 9 is a sectional elevation view taken on line 9—9 of Fig. 2.

Fig. 10 is a side elevation view of a log-positioner truck taken in association with a central transverse sectional view of the machine showing the manner in which a log is positioned between the side rails laterally and the sets of end chuck plates longitudinally before being secured in position to be sawed.

Fig. 11 is a plan view of some details of the operating mechanism shown in Fig. 10.

Fig. 12 is a wiring diagram showing the electric wiring circuit for operating the device.

As illustrated, the main frame of the machine comprises, two top side rails 15 and 16, which, as shown in section in Fig. 9, are sufficiently strong I-beams. These I-beams have secured to their front end a heavy plate 17 which will preferably be welded directly to the ends of the side rails 15 and 16, as shown in Fig. 2. A similarly heavy plate 18 is secured to the rear ends of the side rails 15 and 16.

The plates 17 and 18 may be secured by any desired means, preferably by welding. The two side rails 15 and 16 and the end plates 17 and 18 provide an integrated frame structure with the side rails held parallel and with the space between them, or more particularly the sawing part of the space between them, entirely open and unobstructed.

This frame is supported by outwardly diverging rear legs 19 and 20 preferably formed of heavy angle iron and welded at 21 and 22 to the end plate 18, as best shown at the left end of Fig. 2 and in Fig. 3. Likewise the front end of the frame is supported by diverging legs 23 and 24, Figs. 9 and 10, which are welded to the ends of plate 17 as indicated at 25 and 26 at the right of Fig. 2.

The bottom ends of the respective sets of legs 19 and 20 and 23 and 24 are positioned upon and secured to angle iron members 27 and 28 of substantial weight, the ends of the legs being welded to said angle bars and the angle bars forming a support for the machine, distributing the load over any type of flooring or other supporting surface.

The top surfaces 29 and 30 of side rails 15 and 16 form a runway support for a saw carriage designated generally by the numeral 31. This saw carriage, shown in elevation in Figs. 1 and 3, and in plan view in Figs. 2 and 4, embodies a frame formed of four vertical T-iron standards 31', 32, 33 and 34, shown in cross-section in Fig. 2, and, as there shown, outlining a rectangle and extending vertically past the respective outsides of side rails 15 and 16. As best shown in Fig. 1, are upright T-iron standards 33 and 34, it being understood that the upright standards 31' and 32 have the same relationship to side rail 15 that standards 33 and 34 have to side rail 16. The four standards are shown of quite considerable extent, and are rigidly secured together in parallel relation by heavy transverse bars 35 and 36, which are positioned in planes above and below the side rail 16.

A bar 37, Fig. 2, is secured to T-bar uprights 31' and 32 in exactly the same manner that bar 35 is secured to uprights 33 and 34, and both bars 35 and 37 are mounted to overlie the surface 30 on side rails 16 and surface 29 on side rail 15, respectively.

The bar 35 has forked ends 38 and 39 extending outside the limits of uprights 33 and 34. Within the forked ends 38 and 39 of bar 35 are journaled rollers 42 and 43 which rest and roll on the top surface 30 of side rail 16. Similarly within the forked ends 40 and 41 of bar 37 are rollers 44 and 45 which contact and are adapted to roll along the top surface 29 of side rail 15.

Also journaled in sets of ears 46 and 47 extending outwardly from the forked ends 38 and 39 of bar 35 are a pair of vertically disposed rollers 48 and 49, which rollers engage the upper outside edge 50 of the side rail 16, Figs. 1 and 2.

Similarly mounted in ears 51 and 52 on the end portions 41 and 40 of bar 37 are rollers 53 and 54 which engage the outside upper edge 55, Fig. 2, of side rail 15. By this arrangement the saw carriage is held in straight line movement along and supported by the side rails 15 and 16, and particularly the top surfaces 29 and 30 thereof. The relation of the set of rollers 44 and 54 and 42 and 48 respectively to the saw carriage and particularly to the top surface and outer edges of the side rails 15 and 16 is well shown in Fig. 3.

Supported by journal boxes 56 and 57, Fig. 2, mounted upon bars 35 and 37 is a heavy saw shaft 58 having thereon a multiplicity of circular saws 59 mounted in a customary manner on the shaft for removal and replacement. The shaft 58 extends above bar 35 to one side of the frame members and is connected by coupling 60 with a gas engine indicated schematically at 61, and provided with a radiator 62, all of well known construction. The engine 61 has its base 63 supported upon a plate 64.

The plate 64 is supported by angle iron bars 65 and 66, Figs. 3 and 4, which are strongly welded at their ends to the T-bars 33 and 34, Figs. 2 and 3.

In a similar manner a saw shaft 67 is secured to the under side of the transverse bars 36 and 36', Figs. 1 and 3, by means of bearing blocks 68 and 69. Upon the shaft 67 are mounted a desired number of circular saw disks 70 which are removably secured to shaft 67 in a customary way.

Extending to outside the limits of T-bar uprights 31' and 32 and rigidly secured at their sides and ends to lower ends of said uprights are a pair of laterally extended bars 71 and 72, Figs. 2 and 3. An extension 73 of shaft 67 goes through a coupling 73' to the shaft of a gas engine 74, schematically indicated in Figs. 2 and 3. This engine is provided with a radiator 75 and has its base 76 resting upon a plate 77 which is in turn supported by the bars 71 and 72.

Gasolene is supplied to the two motors 61 and 74 from a tank 78 supported by uprights 31', 32, 33, 34 and fed to the engines through connections and carburetors, not shown, in a customary manner.

As best shown in Fig. 5, the upper saw shaft 58 is advanced somewhat from the lower saw shaft 67. The respective saws 59 and 70 are in common vertical planes, but the saws 59 and 70 are so set in these planes that conjointly the kerfs which they cut constitute a single cut completely dividing slabs, boards and planks in each sawing operation.

The saws 59 and 70 are held on their respective shafts 58 and 67 by headers 250 and 251 and spacers 252, Fig. 3, in a well-known way. As best shown in Figs. 3 and 5, I provide on the spacers 252 a multiplicity, preferably three on each spacer, of cutting knives 254. The purpose of these knives is to cut off knots or other projections from the side of the log which, adjacent the sawcut, might otherwise contact the spacers of the saw arbor.

In the type of sawing which I do, wherein the saw teeth enter and move through the log in a direction opposite to that in which the saw carriage is traveling, that is, along the grain, I have discovered that circular saws, as customarily made, either with the teeth substantially the width of the thickness of the saw disk, or with the teeth having an external set on each side, do not effectively cut out the kerf and remove the cuttings therefrom.

I also discovered that by making a tooth point with inwardly beveled sides and a rearwardly beveled back so as to produce a sharp front cutting edge and two side cutting edges, and having these edges of such size and position that the kerf will be substantially wider than the saw disk on each side thereof, all difficulties in using my method of sawing have been overcome and the saw travels in an accurate straight plane, through knots and twists in the grain, without any tendency for the saw to weave or bind. This construction is very well shown in Figs. 5a and 5b.

Referring to Fig. 5a, it will be noted that the front insert has a right line front face 234 and a beveled or sloping rear surface 235. These two planes meet in a sharp edge 236 which, as shown in Fig. 5b, is very considerably wider than the thickness of metal of the saw disk at 237.

Also the side walls 238 and 239 of the tooth point insert have their front edges extending in straight lines from the edge 236 to the saw disk plate, and the side walls 238 and 239 are hollowed out giving it substantially sharp edges 240 and 241 along the sides of the tooth insert.

The actual tooth point insert 242 is shown in plan in Fig. 5a. As there shown it is rectangular at its inside limits and seats in a rectangular notch in the saw disk indicated at 243 on Fig. 5a. The tooth point member 242 is secured in the notch 243 by welding with silver solder, preferably using pliers to position the inserts which are supplied with electric welding current.

A means for moving the saw carriage during sawing operation and returning it to working position is mounted directly upon the saw carriage itself, as best shown in Figs. 1, 3 and 8. Referring to Fig. 3, the uprights 31' and 33 have positioned thereon and welded thereto at 80 and 81 respectively an angle iron bar 79 which extends in both directions outside of the limits of the uprights 31' and 33. A second bar 82 is parallel to bar 79 and is secured to the T-shaped uprights 32 and 34, which uprights have upwardly extending portions 83 and 84, as clearly shown in Fig. 3. Longitudinal bars 85 and 86 which substantially overlie the side rails 15 and 16 are secured to transverse bars 79 and 82 making a frame rigidly supported by the four uprights 31', 33 and 32 and 34, shown in Fig. 2.

The extended portions 83 and 84 of uprights 32 and 34 are connected at their tips by a transverse frame member 87 and are further braced, giving a truss-like effect, by members 88 and 89, as shown in Fig. 3.

Extending downwardly from cross bar 82, which is trussed by supports 83, 84 and bars 87, 88 and 89, Fig. 3, are supporting bars 260 and 261 which extend from the ends of the above defined truss to the supporting bars 65 and 71 for the respective gas engine supports 61 and 74, thus making a very rigid support for the gas engine.

Upon the transverse bar 79 is rigidly mounted a plate-like shelf 90. On this shelf are two substantially identical electric motors 91 and 92 which have their respective motor shafts 93 and 94 in alignment.

On a cross-bar 95 secured at its ends to the plate 90 and the transverse bar 82 is mounted a gear box 96. A shaft 97 extends from the gear box 96 and has thereon two pulley members 98 and 99 respectively. The shaft 97 extends into the gear box and through worm-reduction gearing of standard type (not shown) drives a spur gear 100 and a shaft 101 mounted to extend through the gear box 96.

The motor shaft 93 has on it a drive pulley 102, and the electric motor shaft 94 has thereon a drive pulley 103 of a very considerably larger diameter than the diameter of the pulley 102. A belt 104 connects the small pulley 102 of electric motor 91 with the pulley 99, and a second belt 105 connects the large pulley 103 with the pulley 98.

Thus either motor 91 or 92 may be operated to drive the shaft 97 and the horizontal gear 100. Whichever motor 91 or 92 is in operation will carry on the driving operation and the other and inactive motor will simply have its parts act as rolling idlers, but the smaller motor pulley 102 will obviously drive shaft 97 through pulley 99 much more slowly than will the larger pulley 103.

The electric motors 91 and 92 operate in reverse directions. The motor 91 which drives shaft 97 at the slow speed effects, through the means hereinafter described, the forward movement of the saw carriage 31 at a suitable speed for the sawing action. The motor 92 through its connections above described, drives the saw carriage in reverse or returning position at a much more rapid speed than the motor 91 acts to forward the saw carriage during the sawing action.

The forward and backward movement of the saw carriage is effected in the following manner:

Mounted in bearing blocks 106 on longitudinal member 85, Fig. 8, and 107 on side rail 15, Fig. 2, is a vertical shaft 108 which has on its upper end a large sprocket wheel 109 and on its lower end a spur gear 110. The spur gear meshes with a rack 111 on the web part 112 of side rail I-beam 15, Fig. 9.

Similarly mounted in a bearing block 113 on the longitudinal member 86 and in a bearing block 114 on the side rail 16 is a second vertical shaft 115, which has on its upper end a large sprocket wheel 116, and on its lower end a pinion gear 117, Figs. 2 and 8. The pinion 117 meshes with a rack 118 secured to the web 119 of I-beam side rail 16.

A sprocket chain 120 runs over the drive gear 100 and around the sprocket wheel 116 and also partly around the sprocket wheel 109 and is driven by either electric motor 91 or electric motor 92 from shaft 97, in the one case to forward the carriage and in the other to return it much more rapidly than it is forwarded.

It wil lbe noted that the rack-engaging parts of pinions on vertical shafts 108 and 115 are thus both turned in the same direction, hence these shafts through racks 111 and 118 and the pinions 110 and 114, will produce a balanced drive along substantially the center of gravity of the entire saw carriage to move it along the side rails either forwardly for the sawing operation with the motor 91, or rearwardly with a much more rapid return movement with motor 92. The means for automatically switching in alternating motors 91 and 92 will be later described.

Bolted to rear plate 18 is a heavy base plate 121, Figs. 2 and 5, which carry welded at their rear ends a multiplicity of chuck plates 122. These chuck plates 122, are, therefore, rigidly and immovably held at the rear of the machine.

Similarly a base plate 123 at the front of the machine has welded to it at their front ends a multiplicity of chuck plates 124. The chuck plates 122 and 124 are shown in top plan view in Fig. 2 and in side elevation in Figs. 6 and 7.

As stated, the chuck plates 122 are rigidly welded to base plate 121 and chuck plates 124 are rigidly welded to base plate 123, in each instance so the chuck plates are held in parallel relation and spaced apart equal distances.

The entire assembly of chuck plates 122 is removably secured to end rear plate 18 by bolts 125. The front end assembly of chuck plates 124 is removably secured to a head on a piston rod 126 by bolts 127. It follows that complete assemblies of rear and front chuck plates may be provided, with the chuck plates spaced apart different distances on different assemblies for the sawing of different thicknesses of lumber, as, for example, inch boards, two inch planks and the like.

The front end movable base plate 123 has welded thereto a pair of side members 128 and 129, Figs. 2 and 9, which side members have secured thereto pieces 130 and 131 which overlie the top of side rails 15 and 16 and support the front end of the chuck plate assembly of chuck plate 124 for sliding movement on the side rail.

This sliding movement is effected by a piston or plunger, not shown, in pneumatic or hydraulic cylinder 132, which is supplied with fluid from a standard source, not shown, through a customary conduit 133, all as shown in Figs. 2 and 7.

Within the end areas of chuck plates 122 and 124 are secured a number, preferably three, pointed pins 134, as shown in Fig. 6. These pins are provided with cylindrical shanks seating in horizontal cylindrical bores in the ends of the chuck plates, as shown for both in dotted lines at 135 in Fig. 6.

The pins are drawn to conical points, as best shown in Fig. 6, which points extend in a true vertical line in the vertical planes of the centers of the chuck plates 122 and 124.

The several pins at the sides are secured by set screws 136 and 137 which enter threaded opening at the edge of the chuck plates. The central pin 134 is secured in position by a set screw 138 set in through an opening in the side of chuck plate. In each instance the set screws 136, 137 and 138 are set in so that they do not protrude beyond the plane of the chuck plate surface through which they are secured.

In securing a log in position within the space between the two side rails, mechanism hereinafter more fully described, connected with a truck or tractor, lifts the log to the position indicated in dotted lines at 139 in Fig. 10. The ends of the log will be substantially in contact with the ends of pins 134. After the log has been positioned, as indicated at 140 in Fig. 2, the initial position of the log will be with its rear end close to the points of pins 134 on chuck plates 122 and spaced from the point of the pins 134 on chuck plates 124. While in this position fluid is introduced into the hydraulic or pneumatic cylinder 132 by hand operated means not shown, which simultaneously moves the chuck plate assembly of base plate 123 and chuck plates 124 against the end of the log and forces all the pins 134 of the chuck plate assemblies into the respective ends of the log to secure the log as shown in dotted lines at 140, Fig. 2.

The log is thus held by the chuck plates and the pins in the ends thereof, in the position shown in Fig. 2, where the several vertical rows of pins are shown inserted in the ends of boards and slabs, indicated in dotted lines at 141, at the left of Fig. 2.

Where the log itself is moved on a saw carriage, as is customary practice, the saw teeth are positioned on the saw so they enter the wood of the log moving toward the direction of movement of the log. So far as I know this has always been done with circular saws. The result is that in such practice the saws themselves operate against the forward movement of the log, cut into the grain of the log against the extent of the grain, and thus tend to retard the forward movement of the log and require much greater power to move the log across that movement of the saw teeth, and to effect the sawing of the log.

In the practice of my invention, as clearly shown in Fig. 5, where the saw carriage itself is moved, the saw teeth are turned so as to enter the wood of the log moving in the opposite direction from that of the relative movement of log and carriage. Thus, as shown in Fig. 5, the front of teeth 142 of saw 59 moves into the log down and in reverse direction to the relative movement of log and saw carriage, and the teeth 143 of saw 70 moves up and then away from the direction of relative movement of the saws and saw carriage.

The saws thus are not resisting the movement of the log relative to them, but are in a sense pulling themselves along the saw cut through the log.

Another very great advantage of this arrangement of the saws is that the grain is continually being cut off first, while the saw moves away from the cut already made and the grain part of the sawing comes out in shreds more like excelsior, whereas in the former method of sawing the grain is continually being chopped off in small fragments and comes out as what is referred to as sawdust.

The saving of power required to saw logs with this method is very great, and a cleaner more uniform saw cut results.

In the means shown for positioning the log for being gripped between the two chuck plate assemblies and held by the chuck plate pins, a tractor, designated generally as 144, Fig. 10, is provided with one or more forwardly extending levers 145 pivoted to stands 146 and 147 on the frame of the tractor.

Although not shown in full detail, Fig. 11, the entire frame will preferably be made up of two sets of lever bars 145 and 145', mounted on opposite sides of frame member 148, preferably on opposite sides of the front part of the tractor. The bars 145 and 145' have pivotally connected thereto piston rods 149 connected with pistons, not shown, within cylinders 150.

These cylinders are hydraulic or pneumatic cylinders connected with a source of fluid under pressure, not shown, and controlled by customary valve means, not shown.

Upon the front ends of the forwardly extending bars 145 and 145' are formed upwardly diverging arms 151 and 152, which form a V-shaped seat 153 to receive the side of the log, indicated in dotted lines at 139. Mounted on a cross rail 154 are stands 155 having secured thereto an axle 156 which pivotally supports a set of levers 157, 158 and 159 normally held in a retracted position by springs 160.

The cross bar 154 has rigidly secured thereto a vertical stop plate member 161 which is adapted to engage the edges of the I-beam side rail 15, as clearly shown in Fig. 10.

Pivotally connected to the depending ends of levers 157, 158 and 159 are a series of stop bars 162, 163 and 164. These stop bars slide in spaced openings through member 161, Fig. 10. Connections of any suitable kind, indicated in dotted lines at 165, Fig. 10, go to pull buttons 166 located adjacent the position of the driver on the tractor.

When a selected one of the pull buttons is operated one or the other of the stop bars 162, 163 or 164, according to the diameter of the log being positioned, will be caused to project beyond the stop plate member, where it will engage the bottom surfaces of I-beam side rail 15 and thus effect positioning of the log vertically so that it will be substantially centered in the space between the side rails 15 and 16.

Through connections, not shown, operation of any of the pull buttons 166 will simultaneously open the valves (not shown) to the hydraulic or pneumatic cylinders 150 which will lift the log to the position determined by the particular stop bar 162, 163 or 164 which has been employed.

By this means, with the use of reasonable skill and judgment by the operator, the log to be sawed may be accurately positioned within the space between the two side rails so that the chuck plates and the pins thereon can be forced into the ends of the log, whereupon the positioning means on the tractor will be withdrawn and sawing will be proceeded with.

When the sawing operation has been completed in the manner hereinafter described and the slabs and boards have been dropped from between the side rails 15 and 16, means must be and is provided for withdrawing them from the space below the machine to permit a new log to be positioned for sawing. Some sort of conveying means must be provided for that purpose, which may be a transverse conveyor for carrying the lumber laterally from the machine, and which is not herein shown, or as shown, a conveyor for carrying the lumber endwise out of the machine.

As best shown in Figs. 1 and 2, this conveying means may consist of a series of suitably spaced rollers 167 each having end shafts mounted in bearing blocks 168 and 169 secured to the floor plates 170 and 171 of floor supports 27 and 28. The end shaft 172 of the rollers 167 extends over the top of upright flange 173 of floor supporting member 28 and has on said extending portion of the shaft sprocket wheel 174, as clearly shown in Fig. 1.

A sprocket chain 175 runs over the top of and meshes with the sprocket wheel 174. Idler sprocket wheels 176 engage the upper part of sprocket chain 175 between each pair of sprocket wheels 175 and hold it so that it will continuously mesh with the roller-driving sprocket wheels 175, as clearly shown in Fig. 1.

Upon an extended portion of shaft 177 of the rear roller 167 is mounted a pulley 178 which is connected by a belt 179 with a small pulley 180 fast on the shaft 181 of an electric motor 182.

The electric motor 182, like the electric motors 91 and 92, is driven from the same source of power, and they are operated conjointly in the automatic cycle of sawing, and the circuit is so arranged that motor 182 is operated only when motor 92 is operated for bringing back the saw carriage to its initial operating position, as clearly indicated in the wiring diagram of Fig. 12.

Having reference to the wiring diagram of Fig. 12 and to other figures of the drawings, the automatic operation of the sawing cycle will now be described.

The gas engines 61 and 74 are first started in a customary manner by any suitable means, not specifically shown. Initially and before sawing starts the throttles will be open to give the saws a high sawing speed. The position of the electric circuits and the contacts will be as indicated in the wiring diagram of Fig. 12, in which available current from the electrical supply leads 183 and 184 of current supply are blocked from furnishing current to the circuits by the open push button switch indicated at 185.

To start the automatic sawing operation push button 185 is momentarily operated to close the circuit running through solenoids 186 and 187 through wires 188 and 189 which go from lead wire 183 to return wire 190 connecting with supply wire 184 by contact therewith at 191.

Having reference to Fig. 1, it will be noted that solenoid 187 is mounted on a bracket 192 secured to upright 33, and the armature of solenoid 187 is connected through an arm 193 with a lever 194 pivoted at 195 to upright 33. To the outer end of lever 194 is secured a spring member 196 which, on the return movement of the saw carriage to initial position, engages the end 197 of a spring contact member 198 having thereon a contact point 199 which is adapted to engage a contact surface 200 on a spring member 201.

In the wiring diagram the member 194 actuated by solenoid 187 is shown to have operated to swing up the bar 194 and its attached spring member 196 and thus release the spring contact arm 197 to produce contact between contact points 199 and 200. This closes the circuits to motors 91 and 92 through wires 202 and 203. But line wire 204 leading through motor 182 and connecting wire 205 to motor 92 is open at switch point 206 so no current can be supplied to motors 92 and 182.

Solenoid 186 has moved switch 207 to contact switch point 208 and closes circuit through wire 209 running to electric motor 91, which thus is energized and operates to move saw carriage 31 for sawing operation. The ground or return current from motor 91 goes through switch contacts 199 and 200 through wire 210 to contact 211 with supply wire 184.

Having reference to Figs. 1, 2 and 4, there is mounted on the front fork of bar 35 a rod 212 bent, as indicated in Fig. 2, to come over the top surface 30 of the side rail 16. This rod 212 has on its end a spring 213 which is positioned to engage a switch closing member 214. The switch closing member 214 operates the switches 207 and 215 in a switch box 26'. In the wiring diagram the switches 207 and 215 are shown exposed.

Contact of member 213 with member 214 will swing switch blade 207 to break contact at 208 and put forwarding motor 91 out of operation. At the same time it will simultaneously cause switch blade 207 to contact switch point 206 and a second blade 215 to contact switch point 216. Switch point 206 is connected by wire 204 with electric motors 92 and 182 and electric current will with the closing of switches 207 and 206 carry current through electric motors 92 and 182 through wires 203, closed switch at 199, 200 and through wire 210 to line wire 184.

The closing of the circuit by 215, 216 carries current through wire 217 to solenoids 218 and 219 and thence through the solenoids and through wire 190 to line wire 184. These solenoids operate the throttle valves 220 and 221 of the respective gas engines 61 and 74. When the switches 218 and 219 are energized they operate the gas engine throttles to reduce the speed of the respective gas engines to an idling speed for the period during which the saw carriage is moved backward by the reversely operating motor 92, and while motor 91 is inoperative.

Having reference particularly to Fig. 4 in which the spring 213 on the end of wire 212 has engaged the thrust member 214 for the double switch blades 207 and 215 and the return trip of the saw carriage is about to begin, and referring also to the position of the parts in Fig. 1, it will be noted that the spring arm 196 connected with solenoid 187 has its lower end directly in line with the swing arm 198 which has closed the contact at 200 with the switch blade 201.

It follows that at the end of the return trip of the saw carriage 31 the lower end 222 of spring arm 196 will engage the upper end of swing arm 198 and move it to the position at the left of Fig. 1, breaking the circuit through motor 92 at that point and terminating rearward or return movement of the saw carriage.

The circuit through motor 182 will have been closed at the same time that the circuit through motor 92 is closed and motor 182 will, while the carriage is being returned to initial position, be operated to operate rollers 167 to carry the released product of the sawing of the logs, that is the slabs, boards, planks or the like, endwise out of the machine.

There is provided at one side of the frame, shown next to the side rail 15, and rigidly attached to the plate 123 at the head of the chuck plates, 124, a rack member 223, Figs. 2 and 7. This rack member is, of course, moved with the base plate 123 and the assembly of chuck plates 124.

The teeth of the rack member are engaged by a pawl 224, as shown in Fig. 7, so when the hydraulic or pneumatic cylinder has driven the chuck plate assembly 124 to hold the log by means of vertically alined pins 134, as indicated in Fig. 2, the chuck assembly members of chuck plates 122 and 124 are firmly held against any releasing movement.

Upon the pawl 224 is a wing 225 which has a turned up end as indicated at 226 of Fig. 7. As shown in Fig. 5, a forwardly projected finger-like lifter member 227 is connected with the saw frame and mounted to slide along the top surface of side rail 15. This finger-like lifter member has a wedge-shaped end 228 and is directly in line with the outwardly raised wing portion 226 of the pawl 224. When, therefore, the saw carriage has been forwarded so that the beveled end 228 of lifter member 227 comes under the wing 226 of pawl 224 the pawl will be lifted from the toothed rack 223, releasing the chuck plate assembly of chuck plate 124 for forward movement.

Fast on the base plate 123 are a pair of bumper members 229 and 230 which have rearwardly extending therefrom bumper heads 231 and 232, as shown in Fig. 2. These bumper heads are in a position to be engaged by the front end 233 of the inside end parts of fork members 39 and 41. This engagement takes place just after pawl 224 has been lifted to permit forward movement of chuck plate assembly of chuck plates 124 and somewhat before the operation to switch off current from motor 91.

The purpose is to simultaneously effect withdrawing of the pins 134 on both sets of chuck plates 122 and 124 from the ends of the completely sawed log, with the result that the slabs, boards, etc., are dropped upon the rollers 167 at the exact time switches 207 and 215 are shifted to break contact at 208 and to close contacts 206 and 216.

This brings about switching of current through motors 182 and 92, with the result that simultaneously the saw carriage is turned to be moved in reverse, and the slabs, boards or planks are moved by the rollers out of the machine.

Upon the return of the saw carriage to initial position contact of arm 196 with switch arm 197, Fig. 1 at left, will break the circuit at 200 putting motors 92 and 182 out of operation and stopping their operation of the return mechanism and of the slab and board removing rollers. At the same time the circuit to the throttles will remain active and the motor will continue to run at idling speed, that is solenoids 218 and 219 remain energized to hold the throttles for idling speed.

When, however, push button 185 is employed to start a new automatic sawing cycle, contacts at 206 and 216 are broken and contact established at 208 with the result that the throttles of the gas engines are released to produce full sawing speed of the saws, and motor 91 is energized to produce a forwarding movement or sawing movement of the saw carriage 31.

This automatic operation of the complete sawing cycle is a most important advantage of my invention, as it insures perfectly timed and coordinated sawing action with the retarded movement of the saw carriage, the return of the saw carriage at idle speed, operation of the discharge rollers to take the products of the sawing out of the machine and termination of action of the saw carriage until push button 195 is again actuated to bring about another sawing cycle.

Some other highly important advantages of my invention consist in the provision of a machine frame open between side rails, the positioning of a log, which may be of relatively small diameter and/or be crooked, within the space between the side rails of the machine, the holding of the log by pins and chuck plates thrust into the ends of the log and positioned to permit the saws to operate between pairs of chuck plates leaving the resulting sawed slabs, boards, planks or the like held by the chuck plate pins until released at the end of the sawing operation, the movable saw carriage and the saws thereon in relation to a fixedly held log to be operated on by said saws, the saws themselves being formed with cutting ends of the teeth having thereon a front cutting edge substantially wider on both sides than the thickness of the saw disk and with cutting edges on each side of the front cutting edge, and numerous other features of structure and design to make my sawing machine simple and sure in operation, economical to build and keep in operating condition, providing low cost for power, and being particularly adapted to operate upon logs of small diameter and which may be crooked and misshaped.

I claim:

1. A sawing machine, comprising a frame embodying a pair of longitudinally spaced rails, a stationary chuck supported on said frame at one end of the rails, a releasable chuck supported on said frame adjacent the other end of said rails for rigidly holding a log against the first named chuck, a mobile saw carriage supported on said frame for longitudinal movement, a first gang of laterally spaced rotary saw blades supported by said carriage, a second gang of laterally spaced saw blades supported by said carriage with each of the blades of the second gang in the same vertical plane as the corresponding one of the blades of the first gang whereby one blade of each gang operates in the same kerf to effect sawing the log into a plurality of slabs, a conveyor positioned beneath the frame for receiving the sawed slabs, a first motor connected to said conveyor for driving the same, a second motor connected to the saw carriage for moving the same relative to the frame, means cooperable between a portion of the saw carriage and the releasable chuck for moving the latter at the end of a sawing operation to simultaneously release all of the sawed slabs, a circuit including said first and second motors, and switching means in said circuit and engageable by a portion of said saw carriage at the completion of a sawing operation for energizing said first named motor and de-energizing said second named motor.

2. A sawing machine, comprising a frame embodying a pair of laterally spaced rails, a stationary log gripping means supported on said frame at one end of the rails, a movable log gripping means supported on said frame adjacent the other end of the rails, driving means connected to the movable log gripping means for moving the same into engagement with a log, a pawl and rack forming a releasable connection between the frame and the movable log gripping means, a saw carriage supported on said rails for longitudinal movement between said gripping means, a member carried by said carriage and engageable with the pawl when the carriage approaches the movable log gripping means and being operable to release said gripping means from one end of the sawed log, and a bumper carried by said movable log gripping means and engageable with the saw carriage when the latter is completing its movement on the rails to simultaneously release the sawed log from the stationary gripping means.

3. A sawing machine, comprising a frame embodying a pair of laterally spaced rails, a saw carriage supported on said rails for longitudinal movement on the frame, a gang of circular saw blades supported by said carriage for rotary movement in planes parallel to the rails, an internal combustion engine operatively connected to said saw blades for rotating the blades at a first rate when the saw carriage is moved in one direction and at a second rate when the saw carriage is moved in an opposite direction, a throttle control operatively connected to a portion of said engine, a solenoid operator operatively connected to said throttle control, two electric motors operatively connected to the saw carriage for moving the same in opposite directions on the rails, a first circuit including a source of power and one of said motors, a second circuit including a source of power, the other of said motors and said solenoid operator, and a two pole switch mounted for movement between said circuits and positioned in the path of movement of the saw carriage to alternately energize said circuits on movement of the saw carriage.

ELMER A. FUGLIE.

References Cited in the file of this patent

UNITED STATES PATENTS

| Number | Name | Date |
|---|---|---|
| 132,181 | Rouse | Oct. 15, 1872 |
| 247,726 | Whipple | Sept. 27, 1881 |
| 436,420 | Hodgson | Sept. 16, 1890 |
| 684,764 | Cunningham | Oct. 15, 1901 |
| 707,184 | Thomas | Aug. 19, 1902 |
| 720,400 | Brown | Feb. 10, 1903 |
| 834,299 | Heckel | Oct. 30, 1906 |
| 1,323,929 | Thullen | Dec. 2, 1919 |
| 1,394,128 | Weir | Oct. 18, 1921 |
| 1,420,961 | Brady | June 27, 1922 |
| 1,733,062 | Hove | Oct. 22, 1929 |
| 1,791,406 | Foreman et al. | Feb. 3, 1931 |
| 1,813,291 | Herbold | July 7, 1931 |
| 1,815,222 | Swift | July 21, 1931 |
| 1,856,476 | Gardner | May 3, 1932 |
| 1,863,908 | Madsen | June 21, 1932 |
| 1,873,700 | Dempster | Aug. 23, 1932 |
| 2,038,810 | Tautz | Apr. 28, 1936 |
| 2,254,293 | Kaehlert | Sept. 2, 1941 |
| 2,332,526 | Pehel | Oct. 26, 1943 |
| 2,377,236 | Jackson | May 29, 1945 |
| 2,480,536 | Andrus | Aug. 30, 1949 |

FOREIGN PATENTS

| Number | Country | Date |
|---|---|---|
| 6,310 | Great Britain | Mar. 24, 1893 |
| 167,582 | Germany | Feb. 3, 1906 |
| 560,724 | Germany | Oct. 6, 1932 |
| 113,782 | Sweden | Apr. 10, 1945 |
| 74,265 | Norway | Nov. 15, 1948 |